US008377541B2

(12) United States Patent  (10) Patent No.: US 8,377,541 B2
Linares  (45) Date of Patent: Feb. 19, 2013

(54) MOLD AND PROCESS FOR COMBINING METAL/CERAMIC AND POLYMER COMPONENT MIXTURE IN THE FORMATION OF HOMOGENOUS PARTS AND FURTHER INCLUDING AN ARTICLE OF MANUFACTURE AND PROCESS FOR CREATING A COMBINATION PLASTIC AND SILVER COMPOSITE EXHIBITING LIFELONG ANTI-BIOTIC PROPERTIES

(75) Inventor: Miguel A. Linares, Bloomfield Hills, MI (US)

(73) Assignee: Linares Medical Devices, LLC, Auburn Hills, MI (US)

( * ) Notice: Subject to any disclaimer, the term of this patent is extended or adjusted under 35 U.S.C. 154(b) by 0 days.

(21) Appl. No.: 13/274,789

(22) Filed: Oct. 17, 2011

(65) Prior Publication Data

US 2012/0034425 A1    Feb. 9, 2012

Related U.S. Application Data

(62) Division of application No. 12/422,334, filed on Apr. 13, 2009.

(60) Provisional application No. 61/044,169, filed on Apr. 11, 2008, provisional application No. 61/112,978, filed on Nov. 10, 2008.

(51) Int. Cl.
    *B32B 3/00* (2006.01)
(52) U.S. Cl. ......... 428/163; 428/156; 428/172; 428/323
(58) Field of Classification Search .............. 428/156, 428/161, 162, 164, 323, 325, 327, 328, 330, 428/339, 457, 172
    See application file for complete search history.

(56) References Cited

U.S. PATENT DOCUMENTS

| 3,505,437 | A |  | 4/1970 | Eichmann at al. |
| 3,742,109 | A |  | 6/1973 | Zijp et al. |
| 4,008,990 | A |  | 2/1977 | Hiemer et al. |
| 4,089,692 | A |  | 5/1978 | Toeniskoetter et al. |
| 4,094,624 | A |  | 6/1978 | Halm |
| 4,101,464 | A |  | 7/1978 | Kamens et al. |
| 4,240,777 | A |  | 12/1980 | Hallerback et al. |
| 4,573,902 | A |  | 3/1986 | Heilman et al. |
| 4,639,204 | A |  | 1/1987 | Munsey et al. |
| 4,723,904 | A |  | 2/1988 | Maynard et al. |
| 4,824,627 | A |  | 4/1989 | Hammer et al. |
| 4,943,227 | A |  | 7/1990 | Facchini |
| 4,970,045 | A |  | 11/1990 | Steinberg et al. |
| 5,041,182 | A |  | 8/1991 | Sekiguchi et al. |
| 5,094,608 | A |  | 3/1992 | Piazza et al. |
| 5,177,124 | A | * | 1/1993 | Questel et al. ................ 523/219 |
| 5,393,215 | A |  | 2/1995 | Donovan, Sr. |
| 6,648,625 | B2 |  | 11/2003 | Bauer |
| 6,716,384 | B2 |  | 4/2004 | Rusche |
| 7,420,013 | B2 |  | 9/2008 | Riegel et al. |
| 2003/0146550 | A1 |  | 8/2003 | Wohlgemuth |

(Continued)

FOREIGN PATENT DOCUMENTS

JP        3009771 A      1/1991
KR   2001-0050428 A      6/2001

(Continued)

*Primary Examiner* — Catherine A Simone
(74) *Attorney, Agent, or Firm* — Gifford, Krass, Sprinkle, Anderson & Citkowski, P.C.

(57) ABSTRACT

The present invention discloses a composite structural article exhibiting a three dimensional shape and size and including an admixture including at least one of a metal and a ceramic component, this combined with at least one polymeric component. In a further revised application, the article can include an admixture including at least one of a silver and a polymeric component.

10 Claims, 4 Drawing Sheets

U.S. PATENT DOCUMENTS

2004/0070106 A1* 4/2004 Harrington ............. 264/227
2006/0004126 A1 1/2006 Park et al.
2006/0263591 A1 11/2006 Joyce
2012/0034425 A1 2/2012 Linares

FOREIGN PATENT DOCUMENTS

| KR | 2001050428 A | * | 6/2001 |
| KR | 10-0519565 B1 | | 9/2005 |
| KR | 10-0533599 B1 | | 11/2005 |

* cited by examiner

Composite Patent Mix Materials

| Metals/Ceramics | Polymer Plastics |
|---|---|
| Beryllium | ABS 301 |
| Boron | ASA Centrex 811 Black |
| Brass | Acetyl Celcon M270 |
| Bronze | C-Flex TPE Compound |
| Chromium | Delrin |
| Cobalt | Dow Magnum |
| Copper | Dow Pellethane |
| Dysprosium | Dylark EQ PSA. |
| Hafnium | Micholac D2850 Black |
| Iridium | Nylon 13% GF |
| Iron | Nylon 2010 (nylon 6) Natural |
| Lutetium | OIPEKK-C |
| Manganese | PolyProBlack |
| Molybdenum | Polytrope TPP517-2274 Dark Umber |
| Neodymium | PP Natural |
| Nickel | Pulse |
| Niobium | Ultem |
| Palladium | Valox 325 |
| Rhodium | Xenoy 1760 Black EQ |
| Silicon | Zytel |
| Tantalum | |
| Technetium | |
| Titanium | |
| Zirconium | |

Note: All other Metals/Ceramics can be mixed with Thermoset Materials.Polymer Plastics and Thermoset Materials can be mixed with metals and plastic from 1% - 99%

FIG. 1

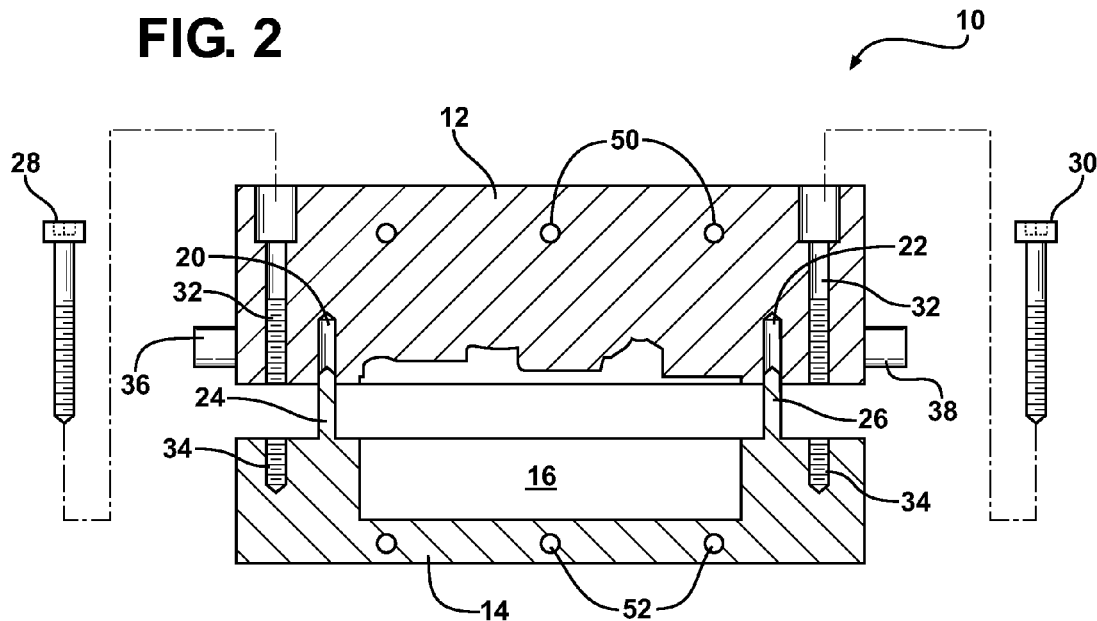
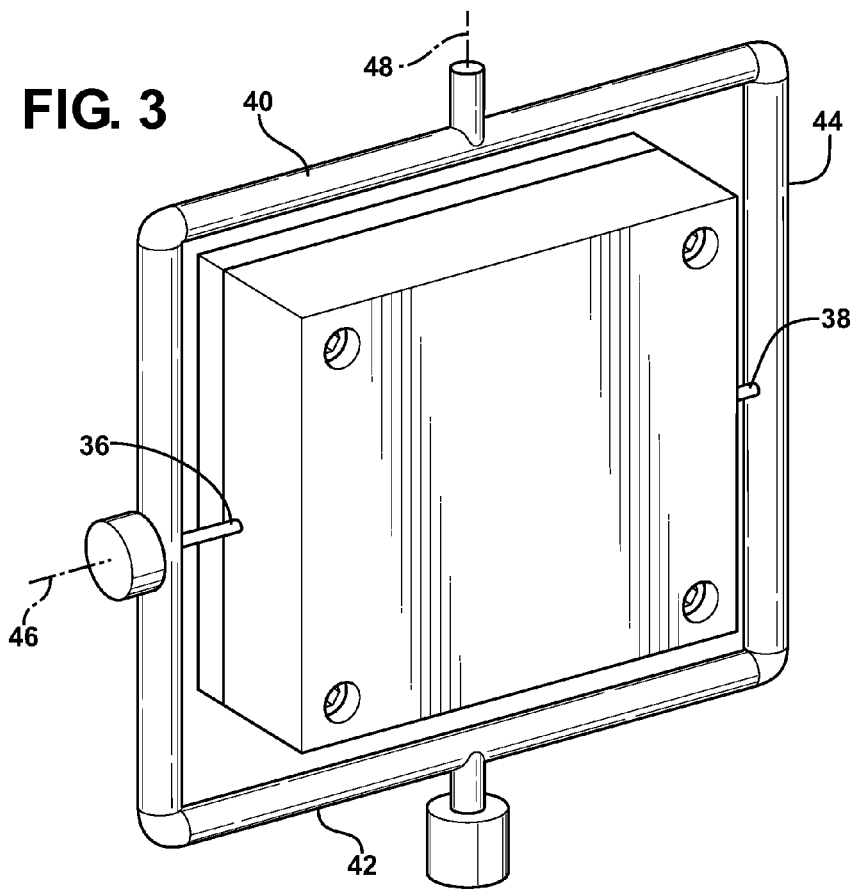

MOLD AND PROCESS FOR COMBINING METAL/CERAMIC AND POLYMER COMPONENT MIXTURE IN THE FORMATION OF HOMOGENOUS PARTS AND FURTHER INCLUDING AN ARTICLE OF MANUFACTURE AND PROCESS FOR CREATING A COMBINATION PLASTIC AND SILVER COMPOSITE EXHIBITING LIFELONG ANTI-BIOTIC PROPERTIES

CROSS-REFERENCE TO RELATED APPLICATIONS

This Application is a divisional of U.S. patent application Ser. No. 12/422,334 filed Apr. 13, 2009, which in turn claims the benefit of both U.S. Provisional Application 61/044,169 filed on Apr. 11, 2008 and U.S. Provisional Application 61/112,978 filed on Nov. 10, 2008.

FIELD OF THE INVENTION

The present invention relates to molds, assemblies and techniques for intermixing metals and/or ceramics in grounded, beaded or powederized form with a thermoplastic or thermosetting polymer in a likewise powder, liquid or micro-pellet form, this in order to produce a composite part exhibiting a homogeneous composition. Additionally, the present invention relates to molds, assemblies and techniques for intermixing first and second materials, such as polymers and metals. In one specific application, the present invention discloses an article of manufacture and process for creating a combination and homogeneously mixed plastic and silver composite exhibiting lifelong anti-biotic properties.

BACKGROUND OF THE INVENTION

The prior art is documented with examples of forming or mixing together materials having distinct properties or characteristics into a composite admixture. A problem associated with combining together such materials, in particular when those materials exhibit different or unique characteristics, is the inability of such admixtures to achieve sufficient uniformity or homogeneousness.

SUMMARY OF THE INVENTION

The present invention discloses a composite structural article exhibiting a three dimensional shape and size and which includes an admixture of at least one of a metal and a ceramic component, combined with at least one polymeric component. The metal and/or ceramic component can further be provided according to at least one of a grounded, beaded, or powder form, whereas the polymeric component can further be provided according to at least one of a powder, micro-pellet or liquid form. The polymeric component may also include any of a thermoplastic and/or a thermosetting component, and further including such as a composite admixture of the two.

In one preferred application, a multiple metal/ceramic and polymeric component is admixed together into a composite matrix. The metallic and/or ceramic components can include any of a Beryllium, Boron, Brass, Bronze, Chromium, Cobalt, Copper, Dysprosium, Hafnium, Iridium, Iron, Lutetium, Manganese, Molybdenum, Neodymium, Nickel, Niobium, Palladium, Rhodium, Silicon, Tantalum, Technetium, Titanium and Zirconium.

The polymeric component can also include any of an ABS 301, ASA Centrex 811 Black, Acetyl Celcon M270, C-Flex TPE Compound, Delrin, Dow Magnum, Dow Pellethane, Dylark EQ PSA, Micholac D2850 Black, Nylon 13% GF, Nylon 2010 (nylon 6) Natural, OIPEKK-C, PolyProBlack, Polytrope TPP517-2274 Dark Umber, PP Natural, Pulse, Ultem, Valox 325, Xenoy 1760 Black EQ, and Zytel.

A related composite structural article exhibits an admixture including at least one of a silver and a polymeric component. The silver is provided according to at least one of a granulate or a particulate form and which is intermixed within a three dimensional polymeric matrix.

The polymeric component can further be provided according to at least one of a powder, micro-pellet or liquid form and prior to combining with the silver within a mold. The polymeric component can further include at least one of a thermoplastic and a thermosetting component. The polymeric component further includes at least one of an ABS 301, ASA Centrex 811 Black, Acetyl Celcon M270, C-Flex TPE Compound, Delrin, Dow Magnum, Dow Pellethane, Dylark EQ PSA, Micholac D2850 Black, Nylon 13% GF, Nylon 2010 (nylon 6) Natural, OIPEKK-C, PolyProBlack, Polytrope TPP517-2274 Dark Umber, PP Natural, Pulse, Ultem, Valox 325, Xenoy 1760 Black EQ, and Zytel.

At least one additional metal/ceramic and polymeric component is admixed together with the silver into a composite matrix. The metallic and/or ceramic components can include at least one of a Beryllium, Boron, Brass, Bronze, Chromium, Cobalt, Copper, Dysprosium, Hafnium, Iridium, Iron, Lutetium, Manganese, Molybdenum, Neodymium, Nickel, Niobium, Palladium, Rhodium, Silicon, Tantalum, Technetium, Titanium and Zirconium.

In an additional sub-variant, the silver component includes at least one sheet arranged in interspersed and spaced apart fashion relative to a three dimensional polymeric matrix. This can further include a top and bottom surface sheets, containing therebetween the polymeric matrix. The sheets may further exhibit undercut portions for engaging within the polymeric matrix. Alternatively, the sheet can possess a wave like profile.

The present invention also includes a mold assembly for use in producing a composite structural article, this including an upper assembleable half and an opposing and lower assembleable half, these collectively defining therebetween an interior cavity corresponding in enclosed three dimensional configuration to the article. Respective locating guide recesses and inserting pins are established between mating surfaces of the mold halves and which, upon locating and securing the mold halves together, additionally receiving insert fasteners to secure the mold halves together. Insert fasteners engage through interiorly threaded mounting holes which are aligned between the mold halves, such as upon the pins and recesses seating relative to one another. A gyroscopic (i.e. multi-axially rotating) cage is provided supporting the mold for rotation about first and second rotational axes.

A related mold process creates the composite structural article and includes the steps of heating a mold tool exhibiting an interiorly and three dimensional defining cavity to a desired elevated temperature, premixing a desired percentage of at least one of metal and a ceramic component, following which a desired component of a polymeric material is added. Additional steps include depositing the composite mixture of ingredients, such as by empyting or pouring, into the open cavity, closing the mold such that the cavity is sealed, rotating the closed mold about multiple axes and such that centrifugal forces generated in turn cause the admixed components to evenly distribute, and cooling prior to removal of a completed part.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an itemized listing of metal/ceramic and polymer components incorporated into the composite part mold and process;

FIG. 2 is a side cutaway of an assembleable mold for producing a composite part;

FIG. 3 is a perspective view of an assembled mold, prefilled with a volume of composite mix, and concurrently rotated about first and second perpendicular axes;

DETAILED DESCRIPTION OF THE PREFERRED EMBODIMENTS

Referring to the present illustrations, a series of molds, assemblies and techniques are disclosed for intermixing metals and/or ceramics in grounded, beaded or powderized form with a thermoplastic or thermosetting polymer in a likewise powder, liquid or micro-pellet form. This is accomplished in order to produce a composite part exhibiting a homogeneous composition and which can function in a variety of different structural applications.

Referring first to FIG. 1, an itemized listing is provided of metal/ceramic, as well as polymer components incorporated into the composite part mold and process. In particular, the present invention contemplates the combining of metal and/or ceramic with any type of plastic (with varying percentage ranges) which, in cooperation with the associated mold processes and techniques, create generally homogeneously appearing and three dimensional articles.

While not intended to be complete or exhaustive listing according to any measure, an incomplete listing of metal/ceramic components can include one or more of: Beryllium, Boron, Brass, Bronze, Chromium, Cobalt, Copper, Dysprosium, Hafnium, Iridium, Iron, Lutetium, Manganese, Molybdenum, Neodymium, Nickel, Niobium, Palladium, Rhodium, Silicon, Tantalum, Technetium, Titanium and Zirconium.

Associated polymer or plastic based components can likewise include (according to a non-exhaustive listing), such as: ABS 301, ASA Centrex 811 Black, Acetyl Celcon M270, C-Flex TPE Compound, Delrin, Dow Magnum, Dow Pellethane, Dylark EQ PSA, Micholac D2850 Black, Nylon 13% GF, Nylon 2010 (nylon 6) Natural, OIPEKK-C, PolyPro-Black, Polytrope TPP517-2274 Dark Umber, PP Natural, Pulse, Ultem, Valox 325, Xenoy 1760 Black EQ, and Zytel.

All other metals/ceramics can also be inter-mixed with thermosetting (or thermoplastic) materials. The polymer and thermosetting materials can also be mixed with the metal and plastics according to any relative percentage range (by either weight or volume) ranging from 1%-99% per respective components, and in order to create an eventual molded part exhibiting a set of properties associated with a desired application.

As previously described, the manner and consistency of incorporate each metal/ceramic and polymeric (thermoplastic or thermosetting) materials is subject to any desired variance, again which can include the metal/ceramic applied in any one or more of ground, bead or powder materials, exhibiting any desired diameter or granular/particulate size. Correspondingly, the polymer materials can be introduced in any one or more of a powder, micro-pellet and/or liquid form, and in order to achieve the desired evenly mixed (homogeneous) composition associated with the eventual 3D article produced by the associated mold process.

Figure 4:
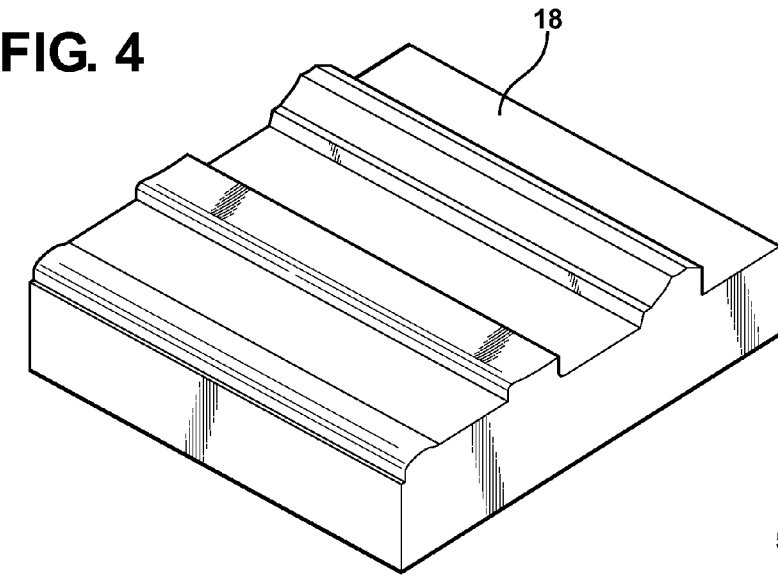
FIG. 4 is a sample illustration of a composite part formed by the process according to the present inventions.

Referring now to FIG. 2, a side cutaway illustration is generally shown at 10 of an assembleable mold for producing a composite part. The mold includes an upper assembleable half 12 and an opposing and lower assembleable half 14, these defining therebetween an interior cavity corresponding in enclosed three dimensional configuration to an eventual composite/homogenized part, see further as representatively shown at 18 in FIG. 4) which is produced according to the present invention.

As further illustrated, the mold halves 12 and 14 include respective locating guide recesses 20 & 22 and inserting pins 24 & 26 established between mating surfaces and which, upon locating and securing the mold halves together, additionally receive inserting fasteners or mounting bolts 28 & 30, these seating and threadably engaging respectively with associated and interiorly threaded mounting holes 32 (in mold half 12) as well as at 34 (in mold half 14), these being aligned upon mating of the mold halves, and upon the pins and recesses seating relative to one another. Additional features shown in FIG. 2 include the provision of a first pair 36 & 38 of axis defining and rotating support locations, these cooperating with a surrounding cage of desired configuration (see elements 40, 42, 44 and 46 in FIG. 3) and such that the enclosed (and pre-filled mold) is capable of being rotated about a first axis 46 (again FIG. 3) in cooperation and simultaneously with being rotated about a second axis 48 and according to a generally gyroscopic fashion.

As further understood, and although not generally shown, a gyroscopic like apparatus typically consists of a rotating wheel so mounted that its axis can turn freely in certain or all directions, and which is capable of maintaining the same absolute direction in space in spite of movements of the mountings and surrounding parts, these again being used to maintain equilibrium, determine direction, etc. That said, the present invention does not provide a more comprehensive depiction of a gyroscopic-like apparatus for supporting and rotating the enclosed mold in multi-axial and selective rotational speeds, it being understood that such technology is available and which is incorporated into the teachings of the present inventions.

A brief operating protocol will now be described in reference to the mixing, filling, rotating and completing the process of creating a three dimensional homogenously evenly mixed and distributed composite part according to the present inventions. It is further again understood that the protocol described below accounts for only one possible configuration for producing the composite part according to the present inventions.

As a first step, the mold tool is heated such that the interiorly and three dimensional defining cavity achieves a desired elevated temperature (in one non-limiting variant approximately 400° F.). Reference is also made to conductive heating channels as shown at 50 and 52 in reference to the upper and lower mold halves in FIG. 1, these communicating an external electrical resistance or other suitable heating medium (not shown) with the generally metallic construction of the mold defining cavity.

A second step contemplates premixing of the materials, such as according to any desired fashion and by which an initial degree of homogeneity is established between the composite materials which respectively exhibit any of a fluidic/granular/aggregate consistency. The admixed materials may further exhibit any desired percentage (by volume or weight) of any type of suitable metal and/or ceramic component, following which a desired component of polymeric material is added.

In a third step, and following the pre-mixing of all ingredients, the mixture is emptied or deposited, such as by pouring, into the open cavity. At this point, the top mold half is aligned and fastened over the bottom mold half. This is typically accomplished with the assistance of hydraulic or mechanical actuators, and given the relative weight of the mold and composite ingredients.

After being secured, mounted and deployed within the gyroscopic style carriage assembly, the enclosed and pre-filled mold is rotated about its multiple axis, see as shown again in FIG. 3, and such that the centrifugal forces generated cause the components to evenly distribute (or to further intermix beyond an initially admixed stage). In a specific further desired application, the composite admixture of materials is caused to gravitate towards outer peripheral locations associated with the composite product thereby produced. The employment of modified centrifugal forces is also desired, again in such particular instances, in the production of an article exhibiting some degree of a hollow interior. Additional aspects of the rotating step include the mold being multi-axially rotated at varying speeds and time intervals.

Following completion of the multi-axial rotation cycle, the tool is subjected to cooling (such as by communicated water, cooling air or the like which is not shown but which is well understood to be within the ordinary skill of one in the art to do). The time frame associated with the cooling cycle can vary however, and in a most extreme instance, can be accomplished in as little as 1-10 seconds. In this fashion, use of a liquid based coolant (e.g. water, glycol solution or the like) can be manipulated such that it does not directly contact the mold cavity, but rather will cool the adjoining surface of the tool, thereby cooling the metal from its elevated temperature (e.g. again 450° F. to a safer release temperature of 100° F.).

In the final step, the cavity is reopened and the finished composite part removed. The mold process employed herein functions to produce a homogenous part exhibiting vastly increased and improved surface properties, and which further makes possible the utilization of a wider variety of metallic/ceramic/polymeric components given again 1) the ability to provide intermixed ratios of one or more of these components according to any relative percentages by volume or weight and 2) the provision of the components in a desired granulate, micro-pellet or liquid form, and such that the desired end product exhibits these intermixed or entrained components according to a fused and hardened even admixture.

Referring finally to FIGS. 5a-5e, the present discloses a series of cutaway plan views of molds, assemblies and techniques are disclosed for intermixing a silver and a (polymeric) plastic material. The use of silver combined with plastics can include providing either or both materials in such as a grounded, beaded, sheet or other 3D form, powderized, micro-pellet or liquid form and in order to create an article exhibiting desired (lifelong) anti-biotic properties. Such a combined article can function as a material matrix for creating medical implements or other structural articles for which sanitary or infectious issues are at play.

By nature, silver is a very ductile and malleable metal exhibiting a brilliant white metallic luster that can take a high degree of polish. It has the highest electrical conductivity of all metals, even higher than. Further, among metals, pure silver has the highest thermal conductivity, as well as among the highest optical reflectivity. Silver also has the lowest contact resistance of any metal. Silver is stable in pure air and water, but tarnishes when it is exposed to air or water containing ozone or hydrogen sulfide.

As is also known, silver ions and silver compounds show a toxic effect on some bacteria, viruses, algae and fungi, typical for heavy metals like lead or mercury, but without the high toxicity to humans that is normally associated with these other metals. Its germicidal effects kill many microbial organisms in vitro (in an artificial environment outside the living organism). Silver's germicidal effects increase its value in utensils and as jewelry. Silver compounds were used to prevent infection in up to the early 1900's and before the advent of antibiotics. Silver nitrate solution was a standard of care but was largely replaced by silver sulfadiazine cream (SSD Cream), which was generally the "standard of care" for the antibacterial and antibiotic treatment of serious burns until the late 1990s.

More recently, there has been renewed interest in silver as a broad-spectrum antimicrobial material. In particular, silver is being used with alginate, a naturally occurring biopolymer derived from seaweed, in a range of products designed to prevent infections as part of wound management procedures, particularly applicable to burn victims.

The present invention seeks to combine (such as through any mold forming, casting, extrusion or admixing process) a plasticized material with silver. Each component is provided in a complementary percentage (1-99%) relative to the other, this in order to create a desired structural article. This is accomplished in order to produce a composite part exhibiting a homogeneous composition and which can function in a variety of different structural applications.

Prior to referring to each of the structural applications shown in FIGS. 5a-5e, an itemized listing is provided of associated polymer or plastic based components can likewise include (according to a non-exhaustive listing), such as: ABS 301, ASA Centrex 811 Black, Acetyl Celcon M270, C-Flex TPE Compound, Delrin, Dow Magnum, Dow Pellethane, Dylark EQ PSA, Micholac D2850 Black, Nylon 13% GF, Nylon 2010 (nylon 6) Natural, OIPEKK-C, PolyProBlack, Polytrope TPP517-2274 Dark Umber, PP Natural, Pulse, Ultem, Valox 325, Xenoy 1760 Black EQ, and Zytel.

As previously stated, the silver material (regardless of liquid, solid or powderized form) can be combined, inter-mixed or admixed with thermosetting (or thermoplastic) materials. The polymer and thermosetting materials can again be mixed with the silver according to any relative percentage range (by either weight or volume) ranging from 1%-99% per respective components, and in order to create an eventual (such as molded) part exhibiting a set of properties associated with a desired application.

Figure 5A:
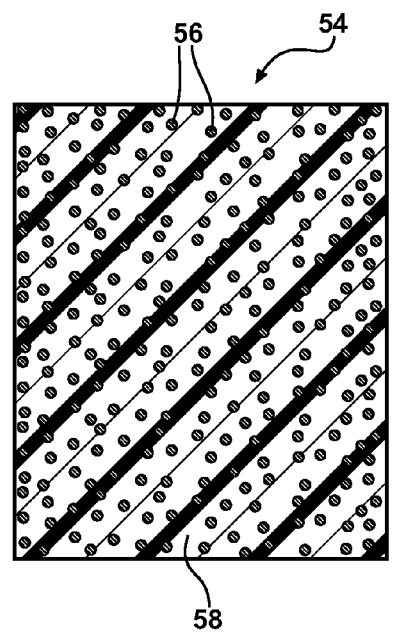
FIGS. 5a-5e are a series of cutaway plan view illustrations of various three dimensional articles which are created by combining or admixing a silver material, such as in varying sheet or granulate form, in cooperation with any of a powderized, fluidized or three dimensionally formed plastic, and in order to create a long term (lifelong) anti-biotic material.

Referring first to FIG. 5a, an illustration is shown at 54 (such as in plan cutaway) of a three dimensional article exhibiting a silver particulate (minority percentage) material 56 intermixed within a plastic (majority percentage) matrix 58. While not shown, the article 54 can be produced such as within a closed mold process (exhibiting a combined heat and pressure), or can be created utilizing extruding or other process forming operations, and by which the silver is provided as a particulate/granulate which is evenly dispersed or distributed throughout the plastic matrix.

Figure 5B:
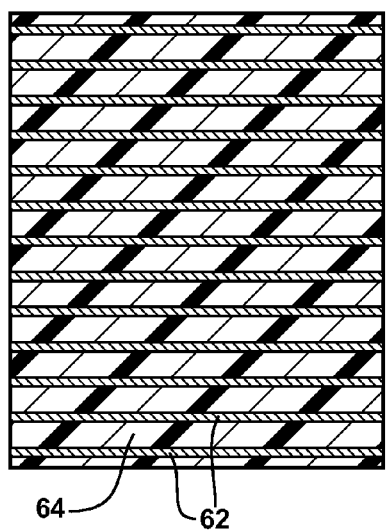

FIG. 5b illustrates, at 60, a variation of a three dimensional article, and by which the silver component is provided as a plurality of individual and spaced apart sheets 62. In one practical manufacturing process, the silver sheets 62 are prearranged or positioned within a closed mold, within which is then injected a plastic matrix 64 to create the desired finished article.

Figure 5C:
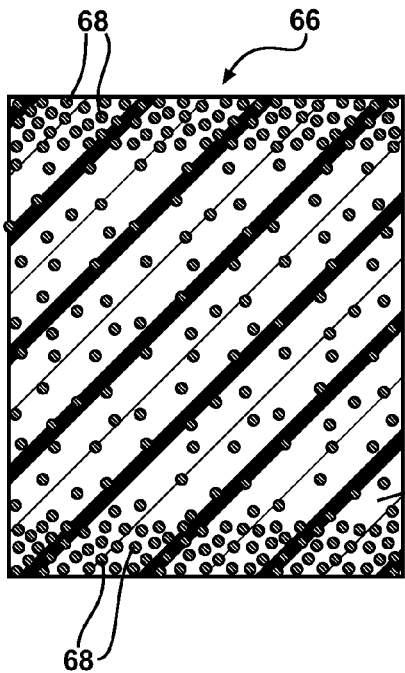

Referring to FIG. 5c, illustrated at 66 is a modification of the three dimensional article as generally shown in FIG. 5b and in particular in which the granulate silver component 68, while interspersed throughout the plasticized matrix 70, is congregated in greater percentages towards the outer (upper and lower) surfaces of the three dimensional article created. In this fashion, the article created can exhibit a maximized antibiotic effect while effectively managing a (minority) percentage of silver intermixed within the plastic matrix.

Figure 5D:
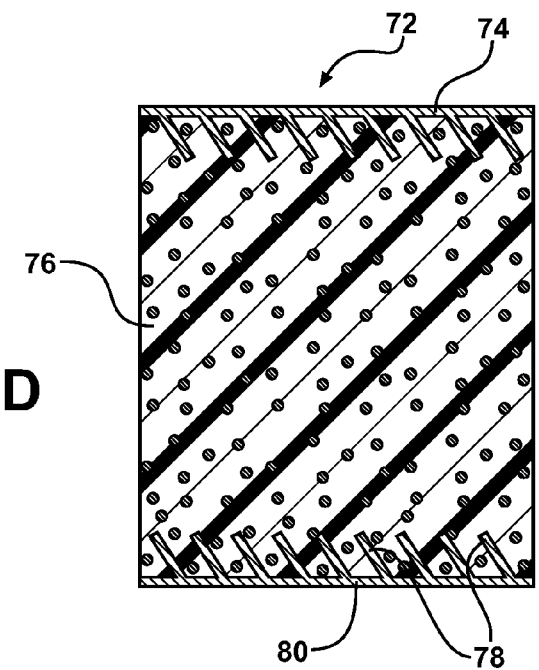

FIG. 5d illustrates at 72 a further plan cutaway of a 3D article and in which a pair of silver sheets 74 are applied to upper and lower surfaces, and between which is formed an interior composed of a plastic matrix 76. As shown, the top and bottom surface applied silver sheets 74 can each exhibit inner extending prongs or undercut portions, at 78, these providing additional gripping force when secured with the plastic matrix interior (such as again during a mold or other suitable formation process). Furthermore, the matrix 76 interior can exhibit either an absence, or a smaller percentage, of silver particulate depending upon the antibiotic requirements and application of the desired article.

Figure 5E:
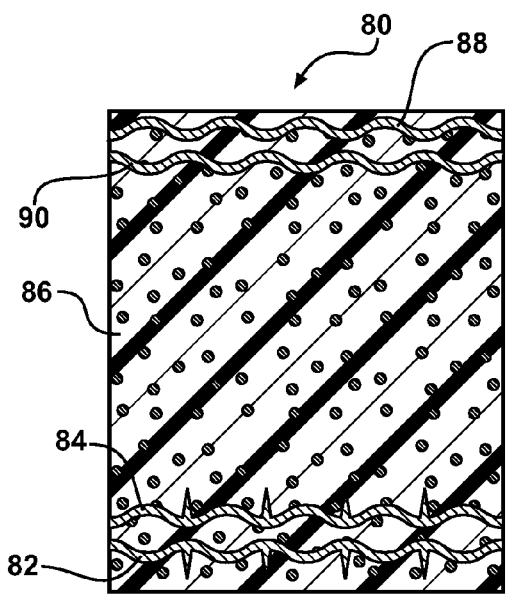

Finally, FIG. 5e illustrates, at 80, a series of undulating, wafer like sheets, see at 82 and 84, which are provided in pairs at both top and bottom surface locations of the matrix material, see further at 86. The silver sheets 82 and 84 further exhibit individual undercut portions, with additional sheets 88 and 90 representing a top surface of the matrix and exhibiting a smooth, wavy-like profile.

Having described my invention, other and additional preferred embodiments will become apparent to those skilled in the art to which it pertains, and without deviating from the scope of the appended claims. This can include the three dimensional article also exhibiting a third component, drawn from any type of additional metal and/or ceramic material and such as which may include Beryllium, Boron, Brass, Bronze, Chromium, Cobalt, Copper, Dysprosium, Hafnium, Iridium, Iron, Lutetium, Manganese, Molybdenum, Neodymium, Nickel, Niobium, Palladium, Rhodium, Silicon, Tantalum, Technetium, Titanium and Zirconium. It is also envisioned and understood that other aggregate or filler components can be incorporated into the three dimensional matrix.

Having described my invention, other and additional preferred embodiments will become apparent to those skilled in the art to which it pertains, and without deviating from the scope of the appended claims.

I claim:

1. A composite structural article comprising:
    said article exhibiting a three dimensional shape and size;
    an admixture including a metal component and a ceramic component, combined with at least one polymeric component;
    said polymeric component further comprising at least one of a thermoplastic and a thermosetting component selected from a known group of materials including at least one of an ABS 301, ASA Centrex 811 Black, Acetyl Celcon M270, C-Flex TPE Compound, Delrin, Dow Magnum, Dow Pellethane, Dylark EQ PSA, Micholac D2850 Black, Nylon 13% GF, Nylon 2010 (nylon 6) Natural, OIPEKK-C, PolyProBlack, Polytrope TPP517-2274 Dark Umber, PP Natural, Pulse, Ultem, Valox 325, Xenoy 1760 Black EQ, and Zytel; and
    said metal and ceramic components each being ground and admixed together, said polymeric component further being provided as a liquid and into which is admixed said metal and ceramic into a homogeneous and composite matrix.

2. The composite article as described in claim 1, said metallic and/or ceramic components including at least one of a Beryllium, Boron, Brass, Bronze, Chromium, Cobalt, Copper, Dysprosium, Hafnium, Iridium, Iron, Lutetium, Manganese, Molybdenum, Neodymium, Nickel, Niobium, Palladium, Rhodium, Silicon, Tantalum, Technetium, Titanium and Zirconium.

3. A composite structural article comprising:
    said article exhibiting a three dimensional shape and size;
    an admixture including at least one of a silver and a polymeric component; and
    said silver component further having at least one sheet arranged in interspersed and spaced apart fashion relative to a three dimensional polymeric matrix, said sheets including top and bottom sheets, containing therebetween said polymeric matrix, said sheets further having undercut portions for engaging within said polymeric matrix.

4. The composite article as described in claim 3, said silver being provided according to at least one of a granulate or a particulate form and which is intermixed within a three dimensional polymeric matrix.

5. The composite article as described in claim 3, said polymeric component being provided according to at least one of a powder, micro-pellet or liquid form and prior to combining with said silver within a mold.

6. The composite article as described in claim 3, further comprising at least one additional metal/ceramic and polymeric components admixed together with said silver into a composite matrix.

7. The composite article as described in claim 6, said metallic and/or ceramic components including at least one of a Beryllium, Boron, Brass, Bronze, Chromium, Cobalt, Copper, Dysprosium, Hafnium, Iridium, Iron, Lutetium, Manganese, Molybdenum, Neodymium, Nickel, Niobium, Palladium, Rhodium, Silicon, Tantalum, Technetium, Titanium and Zirconium.

8. The composite article as described in claim 7, said polymeric component further comprising at least one of a thermoplastic and a thermosetting component selected from a known group of materials including at least one of an ABS 301, ASA Centrex 811 Black, Acetyl Celcon M270, C-Flex TPE Compound, Delrin, Dow Magnum, Dow Pellethane, Dylark EQ PSA, Micholac D2850 Black, Nylon 13% GF, Nylon 2010 (nylon 6) Natural, OIPEKK-C, PolyProBlack, Polytrope TPP517-2274 Dark Umber, PP Natural, Pulse, Ultem, Valox 325, Xenoy 1760 Black EQ, and Zytel.

9. The composite article as described in claim 3, said sheets further comprising a wave like profile.

10. A composite structural article comprising:
    said article exhibiting a three dimensional shape and size;
    an admixture including at least one of a silver and a polymeric component; and
    said silver component further having at least one sheet arranged in interspersed and spaced apart fashion relative to a three dimensional polymeric matrix, said sheets including top and bottom sheets, containing therebetween said polymeric matrix, said sheets further having a wave-like profile.

* * * * *